(12) United States Patent
Gupta et al.

(10) Patent No.: US 8,462,629 B2
(45) Date of Patent: Jun. 11, 2013

(54) COOPERATIVE OPERATION OF NETWORK TRANSPORT AND NETWORK QUALITY OF SERVICE MODULES

(75) Inventors: Nitin Gupta, San Francisco, CA (US); William Welch, San Francisco, CA (US); Steven McCanne, Berkeley, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 11/762,688

(22) Filed: Jun. 13, 2007

(65) Prior Publication Data

US 2007/0297414 A1 Dec. 27, 2007

Related U.S. Application Data

(60) Provisional application No. 60/813,862, filed on Jun. 14, 2006.

(51) Int. Cl.
*G01R 31/08* (2006.01)

(52) U.S. Cl.
USPC .......................................... 370/235; 370/465

(58) Field of Classification Search
USPC .............. 370/229, 230, 230.1, 231, 235, 236, 370/252, 412, 469
See application file for complete search history.

(56) References Cited

U.S. PATENT DOCUMENTS

| | | | |
|---|---|---|---|
| 6,021,446 A * | 2/2000 | Gentry, Jr. | 719/315 |
| 6,233,224 B1 * | 5/2001 | Yamashita et al. | 370/231 |
| 6,587,469 B1 * | 7/2003 | Bragg | 370/401 |
| 6,741,575 B1 * | 5/2004 | Zhang et al. | 370/329 |
| 6,973,033 B1 | 12/2005 | Chiu et al. | |
| 7,010,611 B1 | 3/2006 | Wiryaman et al. | |
| 7,068,660 B2 | 6/2006 | Suni | |
| 7,075,934 B2 | 7/2006 | Chiussi et al. | |
| 7,076,569 B1 * | 7/2006 | Bailey et al. | 709/250 |
| 7,120,666 B2 | 10/2006 | McCanne et al. | |
| 7,146,425 B2 | 12/2006 | Oottamakorn et al. | |
| 7,209,489 B1 * | 4/2007 | Bailey et al. | 370/412 |
| 7,280,478 B2 * | 10/2007 | Oh et al. | 370/235 |
| 7,292,593 B1 * | 11/2007 | Winkles et al. | 370/412 |
| 2004/0215746 A1 | 10/2004 | McCanne et al. | |
| 2006/0015774 A1 * | 1/2006 | Nguyen et al. | 714/18 |
| 2006/0039405 A1 * | 2/2006 | Day et al. | 370/469 |
| 2006/0080671 A1 * | 4/2006 | Day et al. | 719/314 |
| 2007/0237074 A1 * | 10/2007 | Curry | 370/229 |
| 2007/0297414 A1 | 12/2007 | Gupta et al. | |

OTHER PUBLICATIONS

Stoica, I., et al., "A Hierarchal Fair Service Curve Algorithm for Link-Sharing, Real-Time and Priority Services," *Proc ACM SIGCOMM '97*, pp. 249-262, Cannes, France.

(Continued)

*Primary Examiner* — Ricky Ngo
*Assistant Examiner* — Christine Ng
(74) *Attorney, Agent, or Firm* — Davis Wright Tremaine LLP; Philip H. Albert

(57) ABSTRACT

Methods, systems, and apparatus provide efficient and flexible networking quality of service as well as transport protocol design. A hybrid transport/network quality of service (HTNQ) scheme improves the performance of TCP over specific links or network paths that are subject to high latency, a high bandwidth-delay product, high packet loss, and/or bit errors. A callback mechanism can be used between a packet scheduler and a transport module to control the transmission rate of packets across one or more connections or links.

43 Claims, 10 Drawing Sheets

OTHER PUBLICATIONS

Floyd, S., et al., "Link-Sharing and Resource Management Models for Packet Networks," *IEEE/ACM Transactions on Networking*, vol. 3, No. 4, Aug. 1995, pp. 365-386.

Balakrishnan, S., et al., "Improving reliable transport and handoff performance in cellular wireless networks," *Wireless Networks*, vol. 1, No. 4, Dec. 1995, pp. 469-481.

U.S. Appl. No. 12/210,087, Lap Trac, filed Sep. 12, 2008.

International Search Report and Written Opinion mailed Jul. 7, 2008 of PCT/US07/70158 filed May 31, 2007.

International Search Report and Written Opinion mailed Sep. 22, 2008 of PCT/US07/71254 filed Jun. 14, 2007.

U.S. Appl. No. 11/756,584, filed May 31, 2007, now App. Pub No. US2007-0297348 A1, Office Action mailed Jun. 12, 2008.

Balakrishnan, S., et al., "Improving reliable transport and handoff performance in cellular wireless networks," *Wireless Networks*, vol. 1, No. 4, Dec. 1995. pp. 469-481.

Bennet and Zhang, "Hierarchical Packet Fair Queuing Algorithms", Proc. ACM SIGCOMM 1996.

Cruz, R. L., "Service burstiness and dynamic burstiness measures: a framework", Journal of High Speed Networks, vol. 1, No. 2, 1992.

Floyd, S. and V. Jacobson, Link-Sharing and Resource Management Models for Packet Networks, IEEE/ACM Transactions on Networking, vol. 3, No. 4, Aug. 1995.

Saltzer, J. H., et al., "End-to-End Arguments in System Design," *ACM Transactions on Computer Systems*, vol. 2, No. 4, Nov. 1984, pp. 277-288.

Sariowan, H., R. Cruz, and G. Polyzos "Scheduling for Quality of Service Guarantees via Service Curves", Proc. ICCCN Sep. 1995.

Stoica, I., H. Zhang, and T. S. E. Ng in an article entitled "A Hierarchical Fair Service Curve Algorithm for Link-Sharing, Real-Time and Priority Service", Proc. ACM SIGCOMM, 1997, Cannes, France.

\* cited by examiner

US 8,462,629 B2

COOPERATIVE OPERATION OF NETWORK TRANSPORT AND NETWORK QUALITY OF SERVICE MODULES

CLAIM OF PRIORITY

This application claims the benefit of U.S. Provisional Patent Application 60/813,862 entitled "COOPERATIVE OPERATION OF NETWORK QUALITY OF SERVICE MODULES", by Nitin Gupta et al., filed Jun. 14, 2006, the entire contents of which are incorporated herein by reference.

FIELD OF INVENTION

The present invention relates to the area of improving the performance of transport protocols like the Transmission Control Protocol (TCP) in an Internet Protocol (IP) network.

BACKGROUND OF THE INVENTION

An important consequence of the queuing behavior of IP networks is that packets must spend time waiting in the queues of networking devices. This waiting time, often called the "queuing time" or "queuing delay", can degrade the resulting performance of higher layer protocols and applications that utilize the network path through such devices because extra delays are injected into the conversation of two or more communicating end points. Moreover, when the packet rate on a given output port exceeds the port's capacity for a sustained period of time—a phenomenon called network "congestion"—the queue will continue to grow and at some point the networking device will have no choice but to discard certain packets altogether.

There is a delicate tradeoff in how such decisions are made because if the queue is allowed to grow very large, then the queuing delays become large and adversely impact performance. Conversely, if the queue is limited to be very small, then the networking device is not able to absorb bursts of traffic and may drop packets too aggressively likewise causing an adverse impact on performance. Sometimes packets are marked to indicate congestion (using explicit congestion notification, or ECN) to signal to the end points to lower their transmission rates, rather than dropping the packets outright.

When packets are dropped because of congestion, the transport protocol running in the end system affected by such dropped packets typically reacts by adjusting its sending rate downward. For example, TCP follows the well-known additive-increase, multiplicative-decrease (AIMD) congestion control scheme. Roughly speaking, TCP increases its transmission window additively on each round-trip in which no packets are dropped, and decreases its window multiplicatively when packet loss is detected.

Because the window size limits transmission, TCP's throughput in the best case is limited by the window size W divided by the roundtrip time RTT or (W/RTT). However, TCP's throughput is also limited by the way in which the window opens and closes in the presence of packet loss. In an AIMD scheme, the throughput is proportional to $1/\sqrt{p}$ where p is the rate of packet loss. Accordingly, the overall throughput of TCP is proportional to $1/(RTT*\sqrt{p})$. This means that increases in network latency and increases in packet loss rates each have a negative effect on TCP throughput, but also that the two problems in combination aggravate each other.

Even with these problems TCP is widely used because TCP achieves a reliable ordered byte-stream service implemented by the end hosts over an underlying IP network that actually supports only best-effort (unreliable) delivery of datagrams with possible reordering en route. With its congestion control mechanisms, TCP is also "network friendly" to other TCP and non-TCP traffic that is sharing the same network link. A common test for a proposed transport protocol is whether it is similarly "TCP friendly" or "network friendly." However, there are also circumstances in which a network link is completely controlled by a given party, and the controlling party is willing to sacrifice network-friendly behavior if they can get better performance for their traffic across the link.

There are also environments in which TCP's behavior is undesirable. In wireless networks, ordinary TCP cannot distinguish between packet loss due to congestion and packet loss due to corruption. When the packet losses are caused by noise corrupting packets, it is undesirable for the sender to back off. A variety of systems have been proposed and/or implemented to improve TCP behavior in such circumstances. One worth noting (by Balakrishnan et al.) involves the introduction of a snoop agent that both caches TCP packets (to avoid the need to resend them) and suppresses some TCP responses (to avoid shrinking the window inappropriately).

Broadly speaking, the congestion-control mechanisms of TCP are powerful but far from perfect, and there are circumstances in which it is important to work in a better way than the ordinary behavior of TCP. There is also a tension between the desire to have systems that are adaptive, scalable, and built on end-to-end principles on the one hand; and to have systems that deliver predictable or guaranteed levels of service to some forms of traffic on the other hand.

It is therefore desirable to improve upon the prior art in both networking quality of service as well as transport protocol design. It is also desirable to improve the performance of TCP and similar protocols over specific links or network paths that are subject to high latency, a high bandwidth-delay product, high packet loss, and/or bit errors.

SUMMARY

Embodiments of the invention provide efficient and flexible networking quality of service as well as transport protocol design. In one embodiment, a hybrid transport/network quality of service (HNTQ) scheme improves the performance of TCP over specific links or network paths that are subject to high latency, a high bandwidth-delay product, high packet loss, and/or bit errors. In one aspect, a callback mechanism is used between a packet scheduler and a transport module to control the transmission rate of packets across one or more connections or links.

According to one exemplary embodiment of the present invention, a method of communicating packets over a network is provided. A packet scheduler receives at least one packet from a transport module. The packet scheduler then services the received packet. In response to servicing the received packet, the packet scheduler provides a notification to the transport module. In one embodiment, the notification is provided to the transport module upon completion of the servicing of the received packet.

In one embodiment, the transport module receives data for at least one additional packet and buffers the data in a buffer. In response to receiving the notification from the packet scheduler, one or more additional packets are communicated from the transport module to the packet scheduler. In one aspect, a number of additional packets to communicate to the packet scheduler in response to the notification is included in the notification. In another aspect, the transport module determines whether to communicate the one or more additional packets for a particular connection based on that connection's flow control window and not based on a congestion window. In yet another aspect, the transport module determines a network connection associated with the received packet based on the notification. One or more additional packets corresponding to the associated network connection are selected to communicate to the packet scheduler.

In one embodiment, a buffer size of the transport module is changed based on the data in the buffer and the callbacks received from the packet scheduler. In one aspect, a size of the buffer is decreased when an amount of additional packets, which have been in a buffer of the transport module for longer than a round trip time, is larger than a threshold. In another aspect, a size of the buffer is increased when the buffer is full and there are no additional packets available for a particular network connection associated with a notification.

In another embodiment, the received packet includes an indicator adapted to facilitate a notification to the transport module from the packet scheduler upon servicing the received packet. In one aspect, the indicator identifies a procedure of the transport module. The procedure may be adapted to be invoked by the packet scheduler using a local procedure invocation. In another aspect, the indicator identifies a remote location of the transport module.

In one embodiment, the transport module and the packet scheduler are operated within a same device. In one aspect, the device is a network proxy. In another embodiment, the transport module and the packet scheduler are operated within different devices connected via a network. In yet another embodiment, it is determined if the received packet includes an indicator specifying an association with an optimized transport module. If the received packet does not include the indicator, the step of providing the notification is bypassed.

According to another exemplary embodiment of the present invention, a network system that communicates packets is provided. The network system includes a transport module and a packet scheduler, which has an input for receiving a packet from the transport module. The packet scheduler includes logic for servicing the received packet and logic for providing a notification to the transport module in response to servicing the received packet.

In one embodiment, the transport module includes a first input for receiving the notification from the packet scheduler, a second input for receiving data for at least one additional packet, a buffer for buffering the data, and logic for communicating one or more additional packets to the packet scheduler in response to receiving the notification from the packet scheduler. In one aspect, a proxy is situated on a far end of a managed network path from the transport module and advertises a flow control window that is controlled via a configuration of said proxy or via automatic actions performed in said proxy. Logic may determine whether to communicate the one or more additional packets for a particular connection based on that connection's flow control window and not based on a congestion window.

In one embodiment, the transport module further includes logic for identifying a connection of the transport module as HTNQ-enabled and logic for including an indicator in a packet to be communicated to the packet scheduler through an HTNQ-enabled connection. The indicator identifies a packet as requiring a callback mechanism from the packet scheduler. The packet scheduler may further include logic for determining whether the received packet includes an indicator specifying an association with an HTNQ-enabled connection and logic for bypassing the step of providing the notification when the packet does not include the indicator.

In an embodiment, a number of additional packets to communicate to the packet scheduler in response to the notification is configurable by a network administrator or hard coded as a default value. In another embodiment, the packet scheduler further includes a queue adapted to have N buffer sections, where N equals a total number of active connections of the transport module.

According to another exemplary embodiment of the present invention, a packet scheduler has an input for receiving a packet from a transport module, logic for servicing the received packet, and logic for providing a notification to the transport module in response to servicing the received packet. In one embodiment, logic identifies an indicator in the received packet that is used to facilitate the providing of the notification to the transport module.

In one embodiment, the packet scheduler includes a queue and logic for dropping a non-HTNQ packet from the queue when a number of non HTNQ packets exceed a non-HTNQ queue limit. In another embodiment, logic drops an HTNQ packet from the queue when a number of HTNQ packets exceed an HTNQ queue limit and provides an exception condition indicating a number of supportable connections has been exceeded when an HTNQ packet is dropped from the queue.

According to another exemplary embodiment of the present invention, a transport module has a first input for receiving, from a packet scheduler, a notification that is responsive to at least one packet sent from the transport module; a second input for receiving data for at least one additional packet; a buffer for buffering the data; and logic for communicating one or more additional packets to the packet scheduler in response to receiving the notification from the packet scheduler.

In one embodiment, the transport module has a plurality of connections. For each connection, there may be a bit stating whether the connection is active. In one aspect, logic sets a bit to indicate that a connection is active when data is received for that connection. In another aspect, logic sets a bit to indicate that a connection is idle when a notification is received from the packet scheduler and when no packets need to be transmitted for that connection. In another embodiment, the transport module includes a plurality of classes that are grouped in a hierarchical link-sharing organization, and wherein at least one group of the classes are HTNQ enabled and QoS controlled and another group of the classes are congestion-controlled.

The following detailed description together with the accompanying drawings will provide a better understanding of the nature and advantages of the present invention.

DESCRIPTION OF EXEMPLARY EMBODIMENTS

Figure 1A:
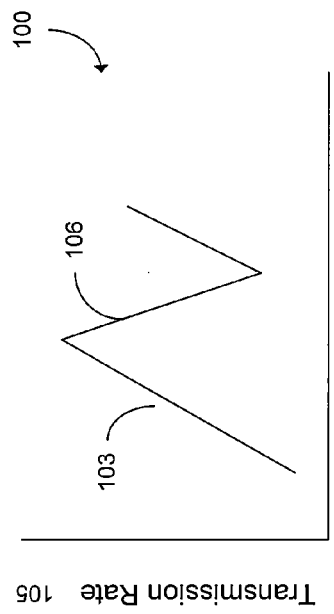
FIG. 1A shows a graph illustrating the transmission rate of a network using the AIMD method in TCP vs. time.

Embodiments of the invention provide efficient and flexible networking quality of service as well as transport protocol design. In one embodiment, a hybrid transport/network quality of service (HNTQ) scheme improves the performance of TCP over specific links or network paths that are subject to high latency, a high bandwidth-delay product, high packet loss, and/or bit errors. In one aspect, a callback mechanism is used between a packet scheduler and a transport module to control the transmission rate of packets across one or more connections or links.

I. INTRODUCTION

Traditionally, the network functions and the transport functions are deliberately separated. Oftentimes the "end to end" argument of Saltzer et al. has been used to argue that as much complexity as possible should be pushed out of the network and into the end hosts. As a result, QoS mechanisms in routers are deliberately kept as simple as possible and mechanisms like connection management, reliable delivery, congestion control and so forth are typically implemented in end host networking stacks.

Generally speaking, routers and switches are devices that operate at the link and network layers and are distinct entities from transport end points that are implemented in separate systems called "hosts" in the TCP/IP nomenclature. There is no explicit communication between the hosts and the network. Hosts simply transmit packets and switches and routers attempt to forward said packets toward their destination. A host otherwise has no control over the router.

In general, the problem of providing differing levels of quality of service (QoS) to network traffic is decomposed into traffic classification, queue management, and scheduling algorithms. Traffic classification entails assigning each packet to a "class", which is typically specified by a network operator. For example, a class might be "voice traffic", or "file server traffic", or "Web traffic between the New York and Orlando offices", etc. Typically, each class will be assigned to a particular queue. Note that more than one class may be assigned to the same queue, causing traffic from those multiple classes to be treated as a single aggregate. When different flows or collections of application sessions are aggregated in this fashion, the resulting scheme is often called Class of Service (CoS) resource management rather than QoS to emphasize the notion that network traffic is managed in a coarser grained fashion.

Queue management entails how a queue is maintained as packets are inserted and removed from the queue and which packets are dropped when the queue becomes full (or begins to become full) in the event of congestion. A first-in, first-out (FIFO) queue with a drop-tail drop policy is a very simple exampling of a queue management scheme. More elaborate schemes like Random Early Detection (RED), Weighted Random Early Detection (WRED), Fair Queueing (FQ), Weighted Fair Queueing (WFQ), deficit round-robin (DRR), etc. have been developed. In a common configuration, a networking device will manage multiple queues for each output port. Packets will be placed in the different queues according to policy that is controlled by traffic classification.

When there are multiple queues on a given port, a scheduling algorithm determines how and what queues are serviced each time a packet is ready to be transmitted over the output port. One of the simpler scheduling algorithms is a static-priority scheduler. In this model, each queue is assigned a priority and at each service time, the non-empty queue with the highest priority is chosen to be serviced. Another example is WFQ. While WFQ can be realized as a queue management scheme, the WFQ algorithm can also be deployed as a scheduler. For example, a collection of FIFO queues might be serviced according to a WFQ schedule. Or, a collection of RED queues might be serviced according to a DRR schedule. Or, a collection of WFQ queues might be serviced according to a WFQ scheduler. This latter approach is sometimes called hierarchical packet fair queuing (H-PFQ).

Figure 1B:
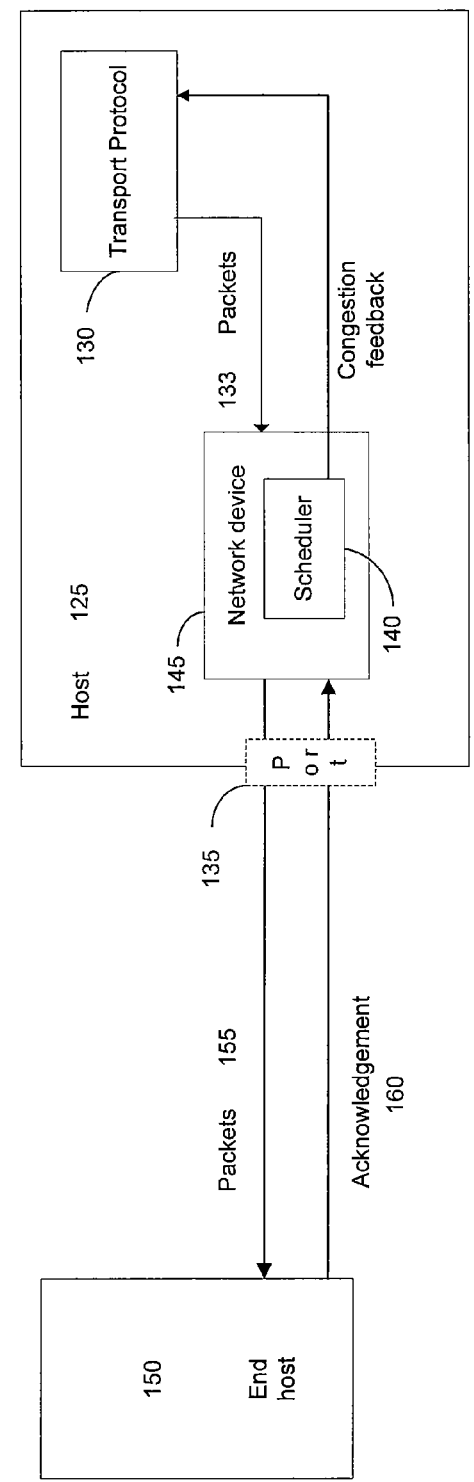
FIG. 1B shows a system illustrating a communication model between two proxies of the network that may be improved by an embodiment of the present invention.

A drawback of any queuing scheme is that it can produce packet loss when queues overflow. In prior art systems, the transport layer in a host typically transmits packets at an increasing rate until the network becomes congested as in the widely deployed additive increase/multiplicative decrease (AIMD) algorithm in TCP. FIG. 1A shows a graph 100 illustrating the transmission rate 105 of a network using the AIMD method in TCP vs. time 110; and FIG. 1B shows a system 120 illustrating a communication model between two proxies of the network that may be improved by an embodiment of the present invention.

In a first region 103, a transport protocol 130 running on a host 125, which may be a proxy, increases the sending rate of a connection through port 135. An output port in a data network is not limited in scope to a physical layer device like a T-1 interface card or a SONET interface. More generally, a port can be a transmission process that sends packets according to a bandwidth shaping rule, where the bandwidth may be fixed or may vary with time. For example, an output port may correspond to a virtual private network (VPN) tunnel where network traffic is groomed to a specified transmission rate over that tunnel. Or, the port may corresponding to a rate-limited transmission of network traffic over a higher-capacity physical interface, e.g., a transmission process that sends packets at 1.5 Mb/s over a 1 Gb/s ethernet connection coupled to a router that is in turn coupled to a T1 connection. Thus, the network traffic is groomed to 1.5 Mb/s in a device that has a 1 Gb/s network interface so that those packets in turn can be transmitted smoothly over a slower speed link. In general the term "link rate" may refer interchangeably herein to either a physical interface rate or to rate of bandwidth shaping rule of a virtual port.

When TCP 130 has data ready to send for a given connection (as allowed by the congestion and flow control windows), it immediately transmits packets 133 by passing them down the network stack to a network-layer device 145, which processes those packets by a packet scheduler 140. At minimum, the packets are queued on a device interface and transmitted over the interface's port 135 at the rate determined by the physical port, and in such cases, the device acts as a simple FIFO packet scheduler. In more complicated scenarios, one of a number of different scheduling algorithms may be configured in the system to manage a particular network interface.

TCP regulates the transmission of packets 133 according to both its flow control window and its congestion window. If the next packet to send is within the range specified by both said windows, then TCP immediately transmits the packet. In effect, TCP can burst up to a window's worth of packets into the network and the queuing mechanisms within the network and within the local network stack absorb such bursts.

Eventually, a switch or router or even the local network stack of the host experiences congestion in the form of a queue that has grown to capacity, or more generally, in the form of a queue management algorithm that has detected incipient congestion. Once congestion has been detected, a packet scheduler 140 in a network-layer device 145 signals feedback to transport protocol 130 indicating that congestion has occurred. Such feedback is either implicit in that the congested packet scheduler 140 drops a packet and the end host 150 infers congestion by detecting the missing packet through coordination between the transport sender and receiver, or the feedback is explicit as in explicit congestion notification (ECN).

In addition, TCP contains logic to retransmit old packets that it believes have been lost in the network. In this case, there are many variations across typical implementation for controlling when and how retransmissions are generated but each tends to follow the "conservation of packets" principle whereby the sender attempts to limit the total number of packets estimated to be pending in the network to the minimum of the congestion window and the flow control window.

In region 106, transport protocol 130 typically reacts by reducing the transmission rate of the corresponding connection, as in AIMD. Upon reducing the sending rate, the congestion is alleviated, and the queue dissipates. The sender begins increasing its rate again as in region 108, and the process repeats.

Systems maintaining complete separation between network functions and transport functions may be suboptimal. For example, a transport protocol in a host implementing AIMD would increase its rate until the network becomes congested. Suppose in this case that the network bottleneck is packet scheduler 140 located within the host proxy 125 itself, e.g., because the proxy is additionally implementing QoS mechanisms to control the proxied traffic according to administrative policies.

In this case, packet scheduler 140 would drop a packet or mark the packet's ECN bit. Transport protocol 130 would only detect the congestion after said marked packets or subsequent packets 155 are received at the end host 150 and acknowledgement packets 160 are then received a round-trip time later then indicating said congestion. Because of the modularity of the prior art architecture, the transport protocol's knowledge of the local congestion event is conveyed by a message exchange requiring a round trip, which round-trip is potentially traversing a wide-area network and thus delaying the notification by a significant amount of time.

Thus, the nature of TCP used in system 120 is that its throughput tends to decrease as packet loss increases, which will also cause an increase in roundtrip time RTT. In the absence of other controls, increased RTT may produce longer queues and a higher likelihood of packet loss from queuing, which in turn further lowers throughput and potentially further increases queuing.

In a current Linux operating system, the situation is slightly better. In this case, if the local network stack detects incipient congestion (e.g., as a result of Linux's RED queuing algorithm) or if the local network stack decides to otherwise drop a packet, that information is returned up the protocol stack to the transport protocol. At that point, the local transport protocol can reduce its transmission rate in response to this locally generated congestion feedback, which is immediate. For example, in this case with respect to TCP, a TCP connection reduces its congestion window in response without having to wait a round-trip time to detect the condition.

However, this configuration is suboptimal because TCP adapts to the local congestion scenario in the same way it adapts to congestion in the network by essentially performing experimentation (by increasing its sending rate), observing the outcome of the experiments (by detecting packet loss), and adjusting the rate downward (by decreasing its congestion window). Accordingly, embodiments implement a better approach that tightly integrates the TCP sending process with the local packet scheduler. By timing the packet transmissions in the transport layer explicitly from the packet-scheduling layer, better performance can be achieved.

In other prior art systems, e.g., so called satellite gateways that optimize TCP traffic for satellite hops, these and other problems are dealt with in a brute force fashion by disabling TCP congestion control entirely. In this approach, the set of active TCP connections are serviced typically in a round-robin fashion such that the aggregate output traffic conforms to a constant bit rate. This bit rate is typically chosen to equal (perhaps with some small amount of headroom) the bandwidth of the underlying satellite channel. While this may be appropriate for a satellite channel where the bandwidth is dedicated entirely to the traffic traversing the satellite gateway, it is not appropriate where the path in question involves other hops that may not be under the control of such a gateway device and thus TCP congestion control should remain intact.

While an approach like the satellite gateway couples the transmission of TCP packets against a constant bit rate packet scheduling process, the same ends are achieved with embodiments of the invention through the use of a superior mechanism that is more general and flexible than the prior art. Instead of having a packet scheduler in the network layer explicitly manage when and how TCP connections send packets, in one embodiment of the present invention, a packet scheduler is generically extended with a mechanism to generate a notification when specially marked packets are serviced and a transport module is modified to mark packets as needing such treatment and is extended to act upon the notifications generated by the scheduler. By adopting a specific set of conventions for how and when the packets are marked and how the notification is handled, the desired tight integration of a transport protocol like TCP with an arbitrary packet-scheduling algorithm in achieved. Also, as described later herein, this scheme can be extended across a network hop using message passing where the packet scheduler is in one device and the transport protocol is in another.

Embodiments of the present invention, including those implemented in network proxies, advantageously do not maintain a separation between the transport protocol and a packet scheduler. Important examples of such a proxy are transaction accelerators as disclosed in both U.S. patent application Ser. No. 10/285,315, filed 30 Oct. 2002, entitled "Transaction Accelerator for Client-Server Communication Systems," and in U.S. patent application Ser. No. 10/640,405, filed 12 Aug. 2003, entitled "Transparent Client-Server Transaction Accelerator." It will be readily apparent to one skilled in the arts that there are also many other systems that use a substantially similar proxy architecture for a variety of purposes.

II. HTNQ

An embodiment of the invention improves upon the prior art in both networking quality of service as well as transport protocol design with a hybrid transport/network quality of service (HTNQ) scheme. This embodiment also improves the performance of TCP over specific links or network paths that are subject to high latency, a high bandwidth-delay product, high packet loss, and/or bit errors through the use of HTNQ.

Unlike prior art, which separates the functionality of the networking layer and the transport layer, HTNQ utilizes a tight coupling between the network QoS mechanisms and the transport protocol. The transport protocol is modified such that it includes an HTNQ mode of operation called herein HTNQ mode. The HTNQ mode is described with respect to a typical TCP implementation though it would be obvious to one skilled in the art how to adapt such mechanisms to other transport protocols and consequently this discussion is not intended to limit the scope of the present invention to the TCP protocol.

In one embodiment, the transport layer marks the packets of one or more connections with a unique identification as being admissible to HTNQ, and the network layer's packet scheduler provides feedback to the transport layer indicating the timing for which the transport layer is allowed to send subsequent packets. In one aspect, the modified packet scheduler and the modified transport protocol stack are co-located in the same device. In one embodiment, this scheme does not compute a window based on rate and round-trip information, assign a rate to each active TCP connection or otherwise try to implement additional flow control for each TCP connection, or explicitly track the set of active TCP connections and service them according to a constant bit rate.

Figure 2:
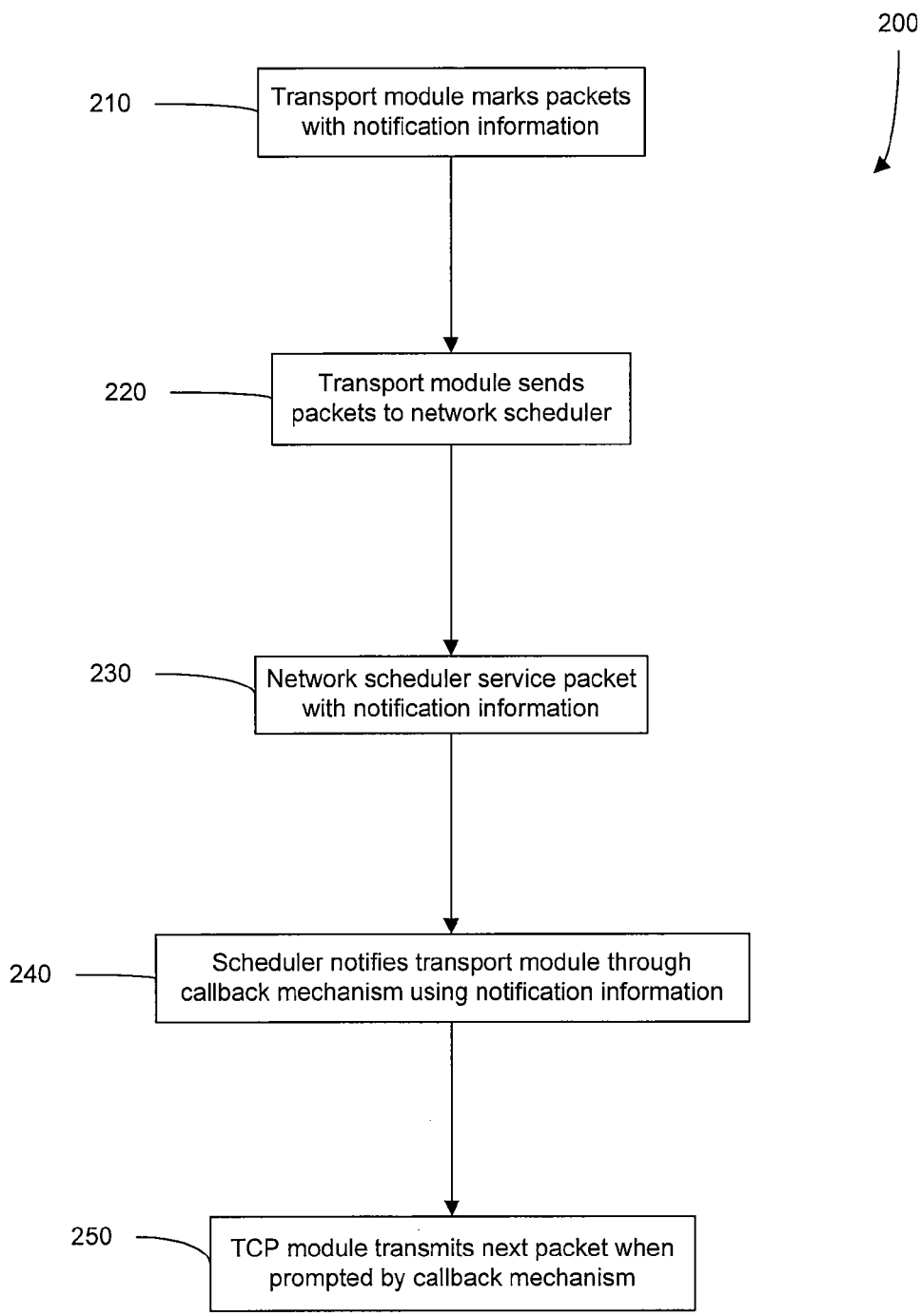
FIG. 2 is a flow diagram illustrating a method for transmitting packets via a network connection according to an embodiment of the present invention.

FIG. 2 is a flow diagram illustrating a method 200 for transmitting packets via a network connection according to an embodiment of the present invention. In step 210, a transport layer (module) marks the packets of one or more connections with unique identification as being admissible to HTNQ. In one aspect, the TCP module inserts notification information in the buffer representing the packet. In an embodiment, this scheme of inserting and providing notification information could be realized by including a pointer to a function that represents the notification mechanism. In another embodiment, the notification information could include a bit in the packet buffer that indicates that the corresponding packet is an HTNQ packet.

In step 220, the transport module sends packets to network scheduler. The normal TCP mode bursts multiple packets into the scheduler, potentially generating a large queue, and then receives feedback tell the TCP to slow down. In contrast, an embodiment of HTNQ effectively controls the rate of the transmission of packets on a given connection according to the local service that those packets would otherwise receive. Rather than build up a queue of packets inside the scheduler, HTNQ limits the number of packets per connection at any given time. This means that when the local packet scheduler is the bottleneck, TCP receives immediate and continuous feedback as to when and at what rate it can transmit packets. In one embodiment, the number of packets is limited to at most one packet per connection at any given time.

In step 230, the scheduler services a packet, which may contain the notification information inserted by the TCP module. In step 240, the scheduler notifies the TCP module using the notification information in the packet buffer. In one embodiment, the scheduler performs the notification by calling the notification function indirectly through the above-mentioned pointer. In another embodiment, in response to a bit being set, the packet scheduler can call a well-known entry point in the TCP module that represents the callback for HTNQ packets. Packets from other protocols could also be marked in a similar manner, with the scheduler calling a different module-specific callback for such other protocols. The sending of the notification may be made upon the start, completion, or any other time during the servicing.

In step 250, in response to the notification from the scheduler, the TCP module transmits the next packet to the scheduler, for example, as part of a generic callback mechanism that can work with any packet scheduler. In one embodiment, a TCP connection obeys the principle that it transmits at most one packet at any given time, and no more packets until the connection has been notified via an HTNQ callback. In another embodiment, the HTNQ mode allows for transmitting different numbers of packets in response to a HTNQ callback.

An instance of this process whereby the packet scheduler posts a notification callback is herein called an HTNQ callback. Packet buffers that include such notification information are called HTNQ packets and packets that do not include such information are called non-HTNQ packets. An embodiment of the invention allows HTNQ and non-HTNQ packets to coexist and ensures predictable behavior when these different types of packets are commingled in the same packet scheduler.

The HTNQ notification model can be implemented in a reusable and modular fashion by performing such functions as a generic queuing discipline. In a typical implementation of a network stack, queuing disciplines can be configured into different scheduling algorithms and mixed and matched in various fashions. For example, an HTNQ queuing discipline might manage the transmit queue of a physical network interface. Or it might be the queuing discipline of a rate-controlled traffic shaper conforming to a token bucket. Or it could be configured as the queuing discipline of each queue that is managed by class-based weighted fair queuing. Or, it could be configured as the queuing discipline of one or more traffic classes of a class-oriented hierarchical link sharing algorithm like Floyd and Jacobson's class-based queuing (CBQ), Linux's hierarchical token bucket (HTB), Stoica's hierarchical fair service curve (HFSC), and so forth.

In further embodiments of the present invention, the HTNQ callback mechanism and queue limit techniques could be integrated into other queue management schemes like random early detection (RED), weighted fair queuing (WFQ), deficit round-robin (DRR), and so forth. In all of these configurations, the present invention is effective because the framework is indifferent as to how particular packets are chosen to be scheduled. No matter how complicated or simple the scheduling decision, once a packet is chosen to be serviced the callback mechanism causes TCP to generate the next packet in a way that works generally across any scheduling algorithm.

Figure 3A:
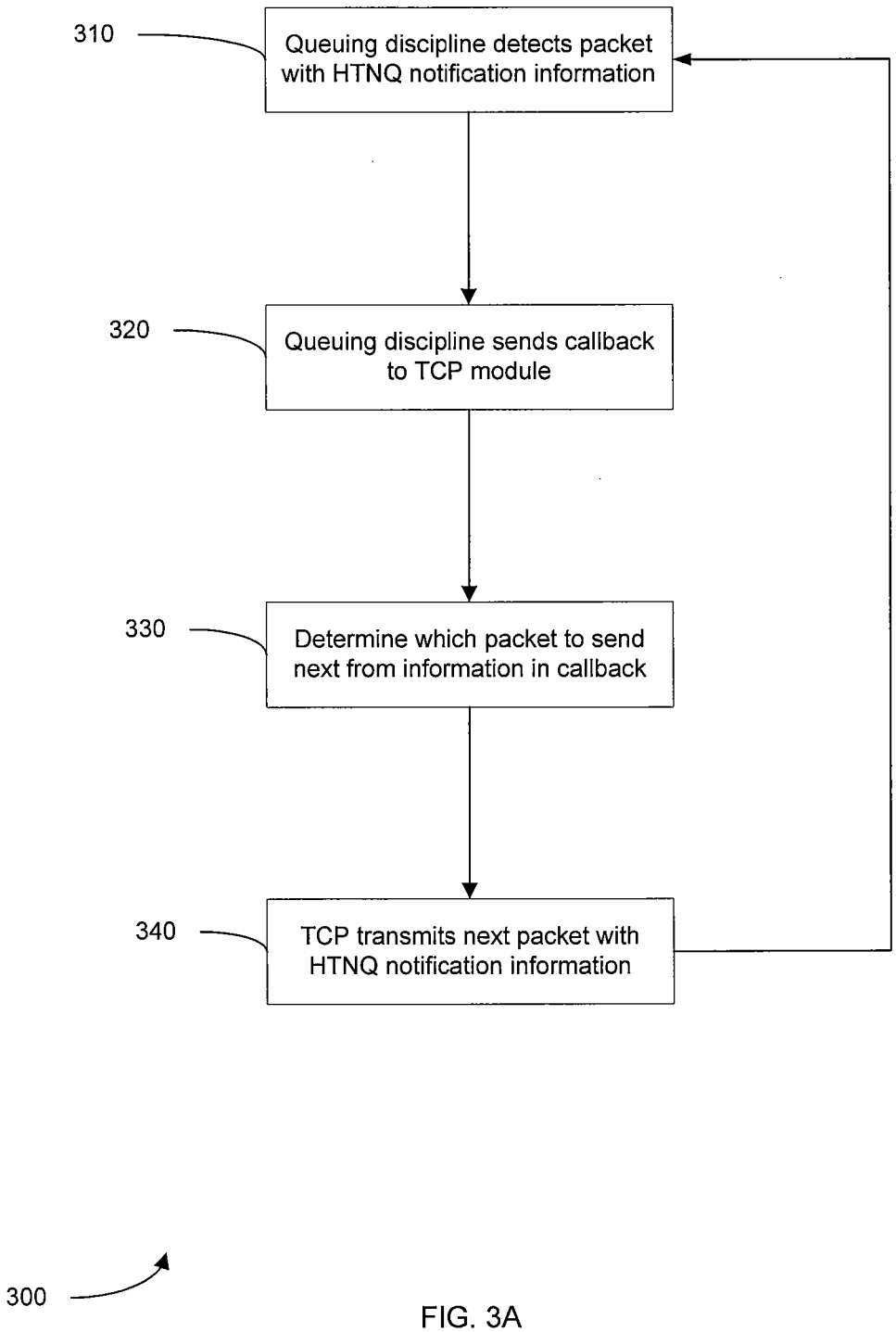
FIGS. 3A and 3B illustrate a method for sending packets to a queue from a transport protocol according to an embodiment of the present invention.
Figure 3B:
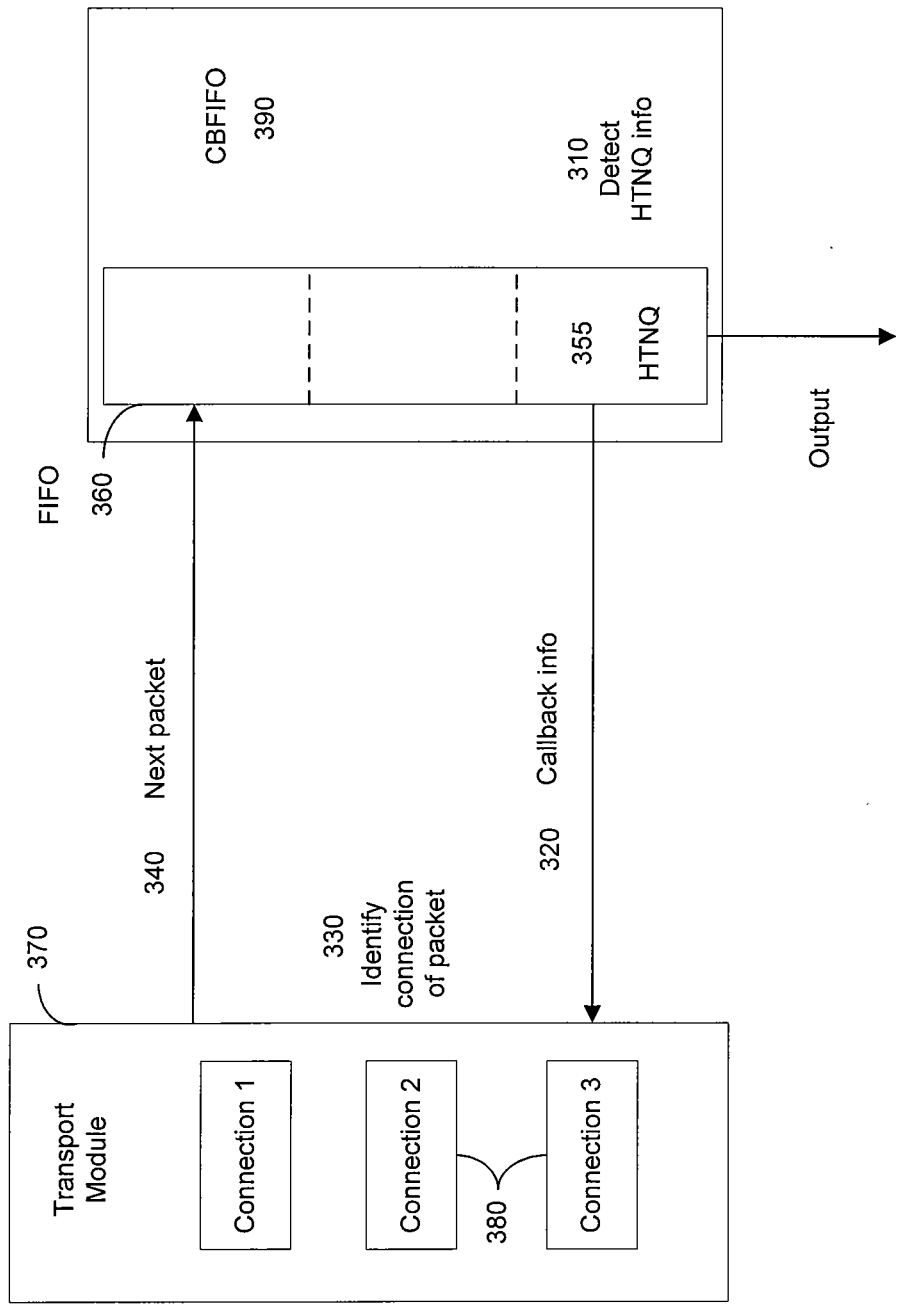

FIGS. 3A and 3B illustrate a method 300 for sending packets to a queue from a transport protocol according to an embodiment of the present invention. In step 310, a queuing discipline detects a packet 355 with HTNQ notification information. In one embodiment, an HTNQ queuing discipline is a FIFO queue. For example, each time a packet is removed from the head of a queue 360 to be transmitted over the underlying physical device, the packet is checked for whether is contains HTNQ notification information. In addition, an embodiment of the TCP module marks each packet buffer from a connection in HTNQ mode with the notification information that enables the HTNQ callback.

In step 320, then the queuing discipline sends a callback to the TCP module. In one embodiment, the packet that is currently being serviced is passed to the TCP module. In another embodiment, the HTNQ callback includes as an argument the packet that is being serviced. In other embodiments, the notification information or HTNQ callback might include flow identification information like an address/port tuple (i.e., IP source and destination, and TCP source and destination port). This call back gives TCP the opportunity to send another packet if possible.

In step 330, each time a notification occurs, the TCP module 370 determines which packet to send next. In one embodiment, from the HTNQ callback, the TCP module can look up the data structure associated with the corresponding connection 380 and attempt to send the next packet with respect to that connection. In another embodiment, the HTNQ callback includes a pointer to the actual connection data structure. However, care must be taken in the latter case to avoid race conditions where a data structure is deallocated while a packet happens to still be stored in a packet scheduler queue and the TCP module attempts to deference a pointer to memory that has been freed.

In step 340, the TCP transmits the next packet, which may subsequently be detected by the queuing discipline. This scheme is herein called callback FIFO, or CBFIFO. HTNQ with CBFIFO is self-clocking in the sense that when a TCP connection transmits a first packet, this causes a callback from CBFIFO packet scheduler to TCP, which causes TCP module to transmit a second packet, which in turn causes another callback from CBFIFO packet scheduler to TCP module, and so forth. Because the TCP module transmits these packets in response to callbacks from the packet scheduler, the TCP module transmits packets at precisely the rate of service dictated by the QoS administrative policy that governs the underlying packet traffic.

In one embodiment, the FIFO queue 360 within a CBFIFO module 390 is implemented such that it guarantees that it will never drop an HTNQ packet. Since the HTNQ convention is that the producer of such packets generates only one packet per callback, the FIFO queue 360 within CBFIFO module 390 is only large enough to hold at least one HTNQ packet per active connection. Thus, in this example, the queue 360 has only three buffer sections, one for each of the three active connections 380.

This is a reasonable design requirement for present day networking and computing systems given even very large workloads in enterprise networks. This convention guarantees the self-clocking callback cycle is continuous and never broken. Otherwise, if the FIFO queue had a limit on HTNQ packets that was smaller than the number of active TCP connections, then a marked packet would be dropped and the TCP module would wait indefinitely for a callback that is never going to occur. In this case, a TCP retransmission timer could be used to detect that the self-clocking cycle was broken and restart the process, but this creates performance problems and is thus not optimal.

In a further embodiment of the present invention, the FIFO queue 360 within the CBFIFO module 390 tracks the number of HTNQ packets as well as the number of non-HTNQ packets. In one aspect, the CBFIFO module 390 is configured with a queue limit. If the number of non-HTNQ packets exceeds this queue limit, then a non-HTNQ packet is dropped from the queue. This approach allows a single CBFIFO module to effectively process both HTNQ packets as well as non-HTNQ packets in a commingled fashion without letting the queue of non-HTNQ packets grow without bound since such traffic would not be adhering to the one-packet-per-callback HTNQ limit.

In yet a further embodiment of the present invention, the queue is also configured with a HTNQ limit. Here, when either the number of HTNQ packets exceeds the HTNQ limit or the number of non-HTNQ packets exceeds the non-HTNQ queue limit, then a packet is dropped. In this configuration, when an HTNQ packet is dropped, the number of supportable connections has been exceeded and an exceptional condition should be raised, for example, by posting an alarm to a management system, by generating an SMTP trap, or by some other similar means. Thus, the status of a connection may be changed.

Figure 4:
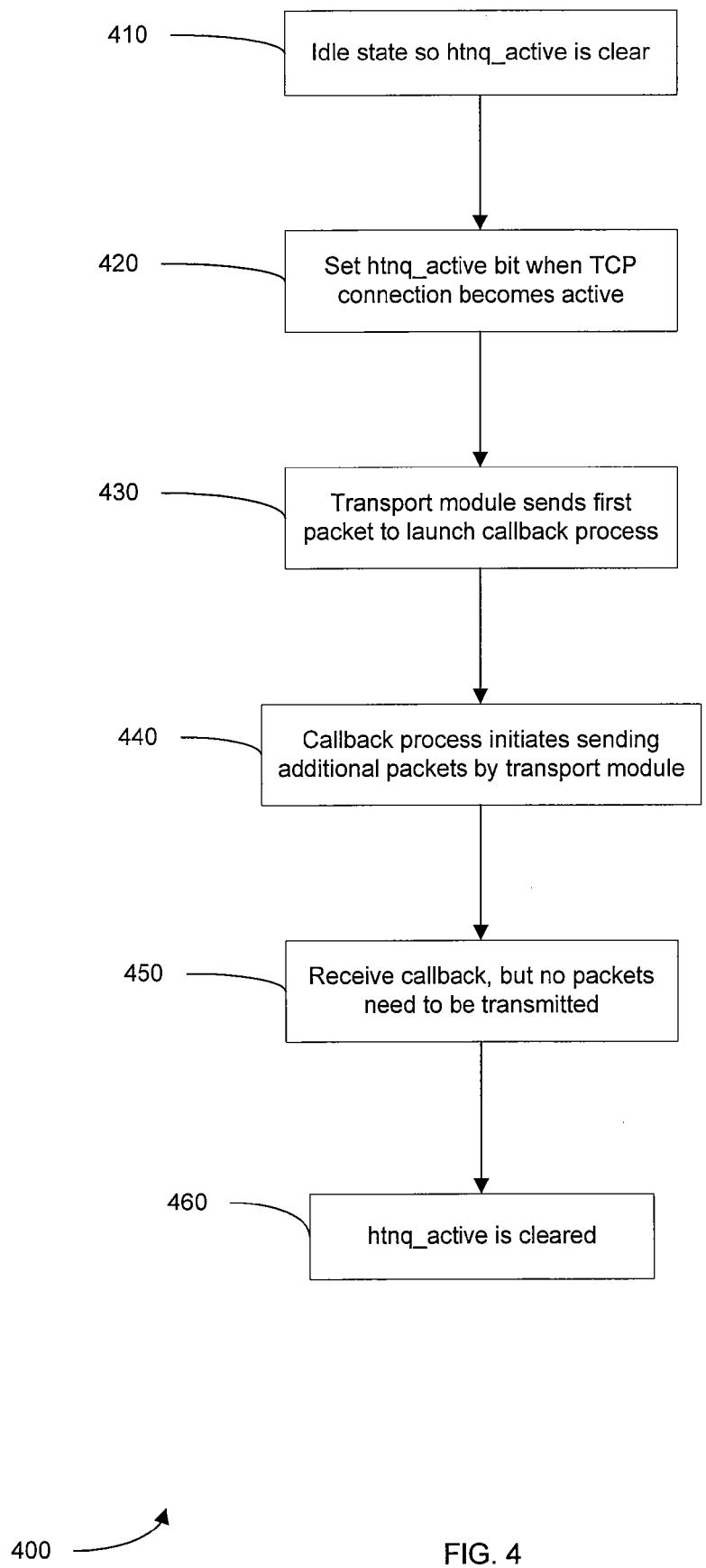
FIG. 4 is a flow diagram illustrating a method for transitioning the status of a connection, e.g. from an idle state to an active state, according to an embodiment of the present invention.

FIG. 4 is a flow diagram illustrating a method 400 for transitioning the status of a connection, e.g. from an idle state to an active state, according to an embodiment of the present invention. An idle state is where there is no data to send and consequently no packets to send. An active state is where there is data that needs to be sent. In one embodiment, an additional bit of state associated with each TCP connection is kept regarding whether or not there is a packet pending in the system and hence whether it is known that a callback is guaranteed to occur in the future. This bit of state, stored in the TCP connection data structure, is herein called the htnq_active bit.

In step 410, the connection is idle, and thus the htnq_active bit is clear. In step 420, when the connection becomes active, the htnq_active bit is set. However, there is no pending packet for that connection in the respective CBFIFO queuing module. In step 430, the TCP module simply sends a first packet to the network layer to launch the callback process.

In step 440, additional packets are then sent by the transport module in response to the callback process. In one embodiment, when the TCP module wants to send subsequent packets but the htnq_active bit is set, no such packets are generated but instead the data is buffered using the normal buffering mechanisms in a typical TCP implementation. In step 450, an HTNQ callback is invoked but no packets need to be transmitted, thus the connection has become idle. In step 460, the hntq_active bit is cleared to reflect that fact that no packet for that connection will be queued in the network layer.

In one aspect, the net effect is that for each active TCP connection, there is exactly one packet belonging to that connection stored in the packet scheduler. That packet serves at least two purposes. First, it exists in the scheduler so that the scheduler can service it in accordance with the QoS policies that are being implemented with respect to the other traffic in the scheduler. And second, it serves as a sort of "on switch" for the connection, a reminder to the scheduler to invoke the HTNQ callback and generate the next HTNQ packet for that connection when the currently queued packet is serviced. In one aspect, the transport-level connections need not be explicitly tracked and managed by the network-level scheduler as each connection's existence is implied by existence of one of its HTNQ packets in the scheduler's buffers.

As the packet scheduler layer often runs in interrupt context and as there are various locking mechanisms employed in typical networking code, the direct communication between the packet scheduler in the network layer and the TCP module, which often runs in a mixture of task context and interrupt context, is handled according to prescribed rules. For example, in the Linux 2.6 kernel, the packet scheduler may invoke a procedure in the TCP module for a given TCP connection to perform the HTNQ callback when that connection state happens to be locked because other processing is concurrently operating within a critical section of code. Then, instead of performing the checks as to whether a new packet should be generate at that time, an embodiment of the present invention marks the connection as needing attention with respect to HTNQ. Once the critical section is completed and the connection's lock is released, the embodiment can note that the HTNQ mechanism needs attention and can at that time determine whether another packet can be passed on to the network layer or whether the htnq_active bit should be cleared because there are no such packets that need be sent.

In one embodiment, to implement the HTNQ callback model, the TCP module is extended with logic to interact properly with the underlying HTNQ queuing discipline. Here, some policy external to the HTNQ system determines when and whether a given TCP connection is to be processed according to the HTNQ framework. For example, the policy might be that all TCP connections are processed this way; or, it might be that all TCP connections between the data center and any remote office are processed this way. In general, such a policy could be integrated with a traffic classification scheme whereby the traffic class to which a connection is classified would include an attribute as to whether connections within said class would be processed in this mode, as further described below.

III. QOS-CONTROLLED TCP

In certain scenarios, a network path or link falls under the complete control of a single network administrative domain. For example, an enterprise may have leased a dedicated circuit from a telecommunication provider, or purchased a VPN service with a guaranteed service-level agreement, or deployed a satellite network with a fixed amount of available bandwidth. Furthermore, at times, such networks can present a challenging environment to the TCP congestion control algorithm, especially when buffers in network routers or switches are undersized or packet loss rates are otherwise high. Such conditions, when combined with high latency, causes performance problems with TCP congestion control.

It has been shown that the throughput of the standard TCP congestion control algorithm decays inversely proportionally to the product of the round-trip time and the square root of the packet loss rate. This means as loss rate and round-trip increase, performance decreases and the impact can be substantial. Moreover, it is also known that the throughput of a TCP connection is artificially limited below the available bandwidth when the queue size at the bottleneck buffer is less than the bandwidth-delay product of the round-trip path. This condition has been observed in real networks and can cause substantial performance degradation of TCP connections.

Figure 5:
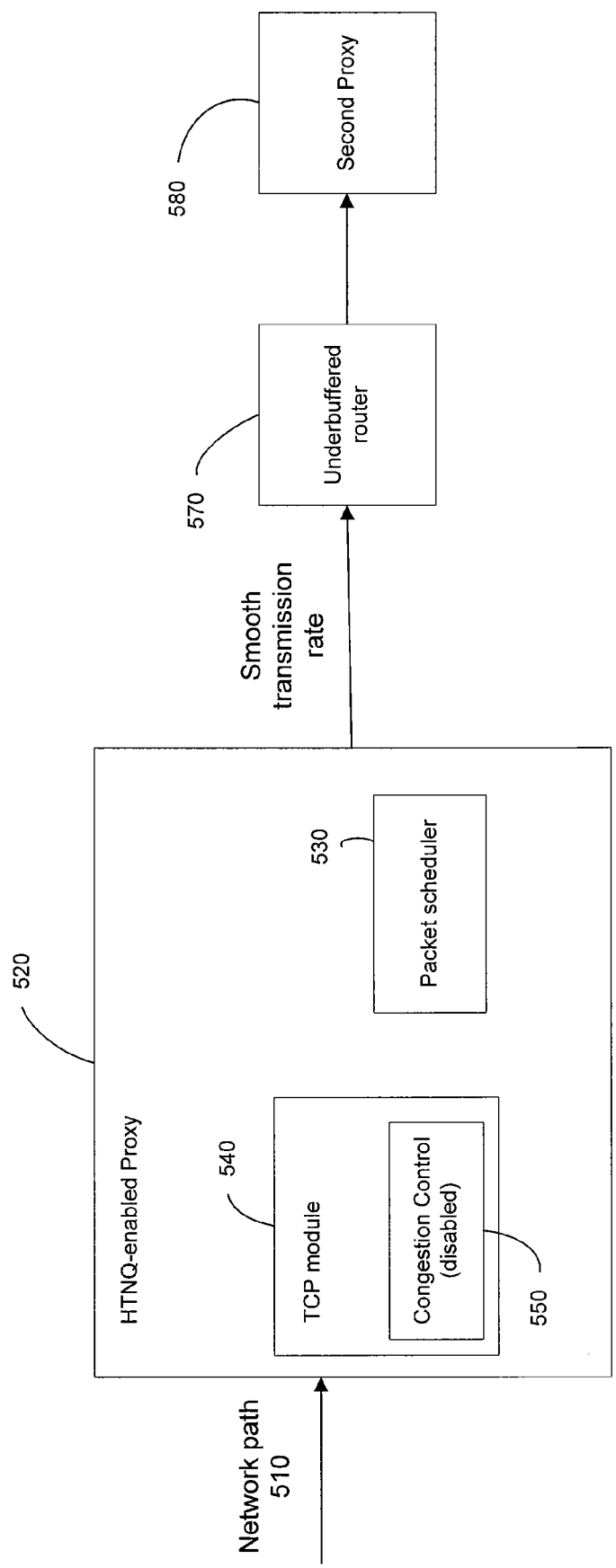
FIG. 5 shows a network system implementing a transport protocol connection according to an embodiment of the present invention.

FIG. 5 shows a network system 500 implementing a transport protocol connection according to an embodiment of the present invention. In this approach, all of the TCP connections traversing a given managed network link (path) 510 flow through an HTNQ-enabled proxy 520. Said connections are terminated in the proxy and interact as described above with an HTNQ-aware packet scheduler 530 co-located in said device. In the TCP module 540, congestion control 550 is disabled or non-existing. In this case, on an HTNQ callback, the TCP module determines whether to send a subsequent packet for a particular connection based only on that connection's flow control window and it otherwise ignores or does not implement a congestion window. This allows the TCP connection to run smoothly at the rate determined by the QoS policy whether or not there are significant packet losses in the network.

In the case of an underbuffered router or switch 570, performance is also superior to an unmodified TCP connection because the traffic is groomed to fit on the network path and thus no queue ever builds up and thus there is no queue overflow even through some switches and/or routers may be underbuffered. Care must be taken in the deployment of such configurations because the traffic generated by this technique is no longer "TCP friendly", meaning that it will not back off in the face of competing traffic causing congestion. In general, such a scenario can be avoided by deploying one or more proxies configured in this manner in a fashion that guarantees that all traffic flowing over the managed path traverse said proxies. However, as described below, it is possible to mix traffic controlled in this fashion with competing legacy TCP traffic in a controlled and predictable fashion.

In one embodiment, a second proxy 580 is situated on the far end of the managed path so that the flow control window advertised by the receiving end of the TCP connection can be controlled by the network operator via configuration of said second proxy or via automatic actions performed in said second proxy. In this fashion, the flow control window is not influenced by the disposition of the client and server communicating the managed path and thus can be determined appropriately for the path in question such that the disposition of said flow control window never becomes the performance bottleneck. This approach herein is called QoS-controlled TCP because the QoS policies within the packet scheduler explicitly control the sending rates of the various TCP connections.

QoS-controlled TCP with HTNQ is a powerful mechanism because network traffic can be controlled in a very precise and deliberate fashion using arbitrary QoS policies while attaining improved performance due to the explicit coupling of the TCP sending rates with said policies. At the same time, such a mechanism allows for predictably managing a mixture of QoS-controlled TCP traffic with congestion-controlled TCP traffic, where the congestion-controlled traffic may not be traversing the same device as the QoS-controlled traffic and may only present itself as competing traffic in some bottleneck router along the managed path.

As described earlier, managing traffic in this fashion leverages HTNQ-enabled class-based traffic management. In this approach, the HTNQ-enabled CBFIFO queuing discipline is configured as the queuing discipline for the leaf classes of a hierarchical link-sharing algorithm like CBQ, HTB, or HFSC. As part of the process of creating a traffic class for one of said scheduling algorithms, the network operator would specify whether the class was to be HTNQ enabled and further whether TCP connections in said class are to be congestion-controlled or QoS-controlled.

Figure 6:
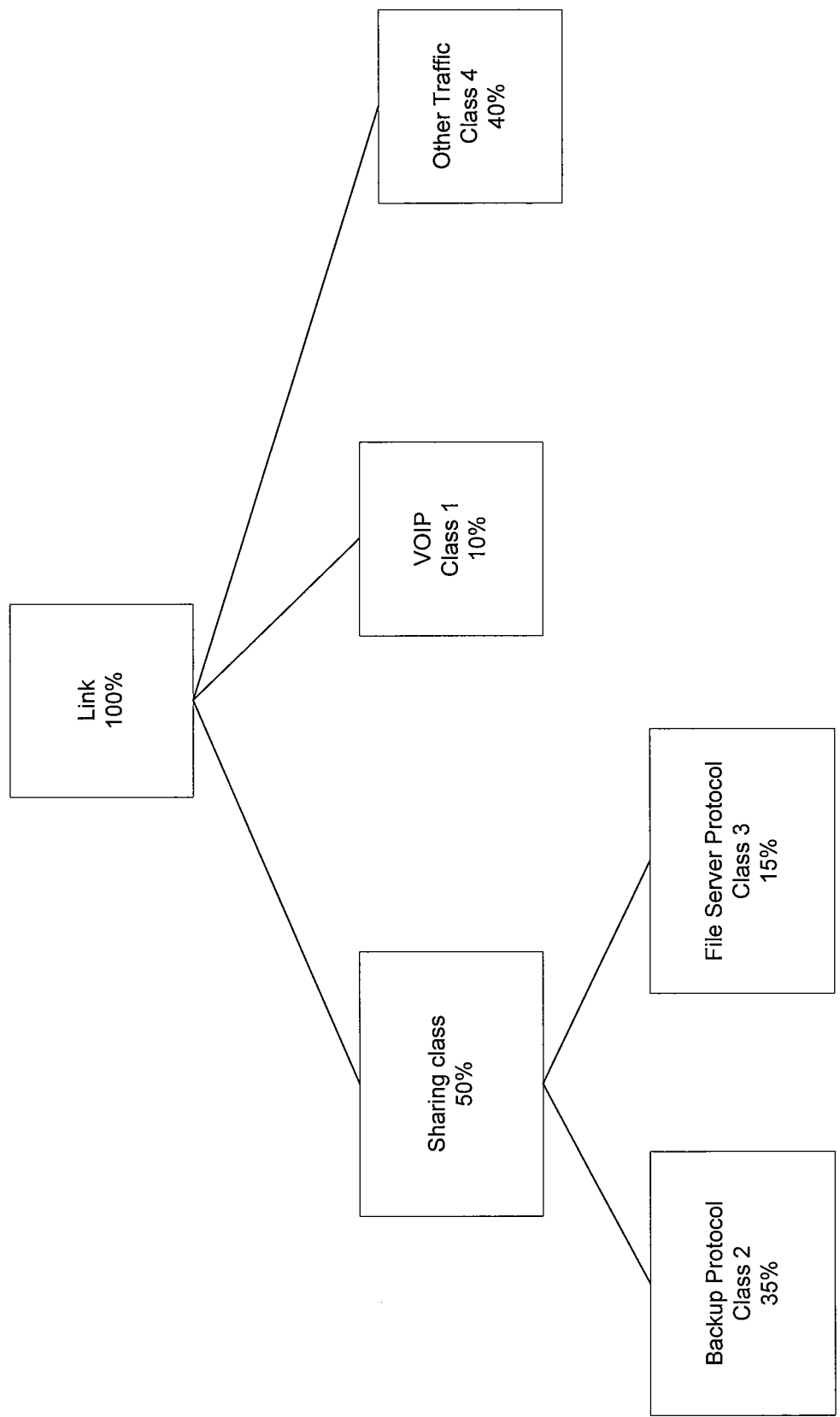
FIG. 6 illustrates a hierarchical link-sharing algorithm according to an embodiment of the present invention.

FIG. 6 illustrates a hierarchical link-sharing algorithm according to an embodiment of the present invention. Suppose a network operator needs to manage a link such that voice over IP (VoIP) traffic has high priority and two important applications (say a backup protocol and a file server protocol) are to be managed by HTNQ, while all other TCP traffic is not to be managed by HTNQ. The operator creates "class 1" for VoIP traffic and assigns 10% of the link bandwidth to it. Then the operator creates "class 2" for the backup protocol and "class 3" for the file server protocol and assigns 35% of the link bandwidth to the former and 15% of the link bandwidth to the latter. In turn, the operator creates a sharing class with 50% of the link bandwidth that is the parent of class 2 and class 3. Then the operator creates "class 4" for all other traffic and assigns 40% of the link bandwidth to that class. Class 1, class 4, and the sharing class are all configured as children of the root class representing the entire link bandwidth. Finally, the operator configures class 2 and class 3 to be HTNQ-enabled and QoS-controlled, and leaves the remaining class configured as non-HTNQ and hence congestion-controlled.

Because of the way hierarchical link sharing scheduling algorithms work, this scenario style of configuration has very powerful properties. For example, if there is only backup traffic present, it will be managed by HTNQ and receive the entire link bandwidth as the link sharing framework will allow the class 2 to utilize or "borrow" the unused bandwidth. On the other hand, if there is backup traffic in the presence of sustained load from other non-backup and non-file-server TCP traffic, then the other traffic will be guaranteed 40% of the bandwidth presuming such traffic is able to utilize that much bandwidth in light of the legacy TCP protocols; at the same time, the backup traffic will be guaranteed 50% of the traffic and will be groomed and optimized to by the HTNQ framework to fully utilize that bandwidth.

In addition, in this example, if there is no VoIP traffic present, then the 10% of the leftover bandwidth is allocated by the scheduler to class 2 and class 4 traffic categories. However, if a VoIP happens to arrive while the class 2 and class 4 traffic is present, the hierarchical scheduler will revert the excess bandwidth back to the class 1 in order to meet the service requirements of that VoIP traffic. As one can see, this is just one example of how traditional QoS policies and mechanism can be predictably deployed and integrated across a mixture of HTNQ traffic and non-HTNQ where the non-HTNQ may further comprise a mixture of TCP and non-TCP traffic like VoIP.

IV. NETWORK-BASED HTNQ

In another embodiment of the present invention, HTNQ can be extended across a network such that the HTNQ-enabled transport protocol is implemented in a device that is separate from the HTNQ-enabled packet scheduler. For example, the transport component might be implemented in an end host coincident to a client or server application running on that end host. Or it might be implemented in a proxy that is situated near such end host client and servers. Likewise, the HTNQ-enabled packet scheduler might be implemented within a wide area router, or a link-layer multiplexer, or a link-layer switch or bridge, and so forth. This approach, which distributes HTNQ across at least two devices, is called herein network-based HTNQ.

Figure 7:
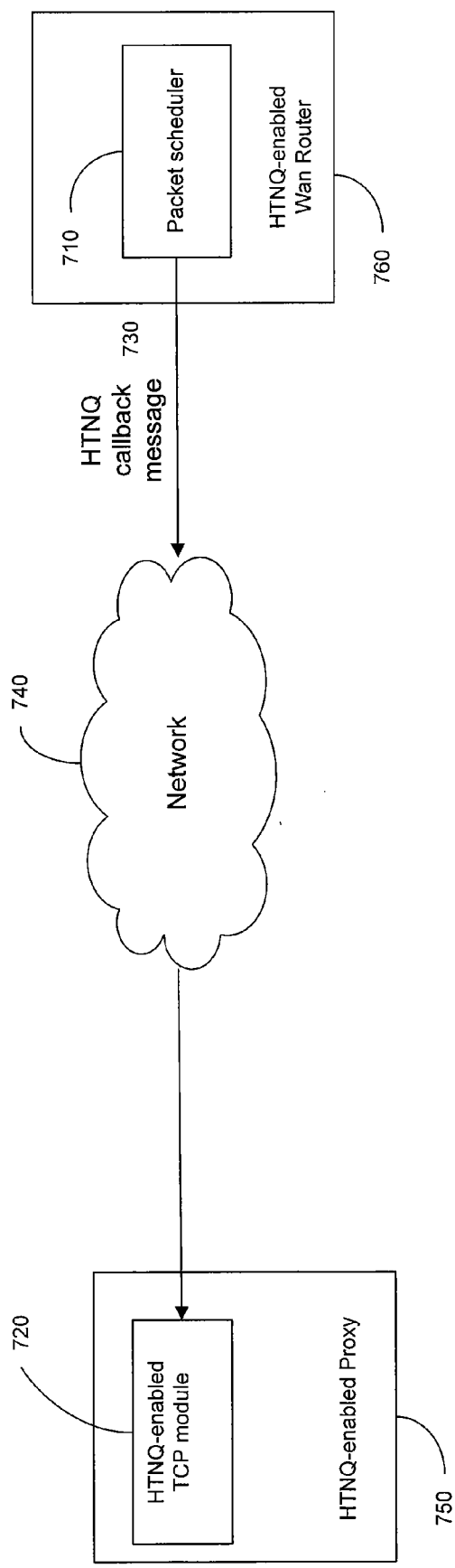
FIG. 7 illustrates a method and system for performing network-based HTNQ according to an embodiment of the present invention.

FIG. 7 illustrates a method and system for performing network-based HTNQ according to an embodiment of the present invention. The HTNQ callback is performed by having the scheduler 710 send a HTNQ callback message 730 over the network 740 to the HTNQ-enabled transport module 720. Such a design can incur additional overhead compared to when the components are co-located in the same device. However, the overhead can be small compared to the advantages afforded by the design. For example, suppose a HTNQ-enabled proxy 750 interacts via network-based HTNQ with an HTNQ-enabled WAN router 760 that manages a moderate bandwidth WAN link. The inter-packet spacing times in this case might be on the order of milliseconds or tens of milliseconds. Thus, imposing a small, sub-millisecond LAN round-trip time on top of the much larger WAN packet time is a small overhead to incur. In a further embodiment of the present invention, the overhead can be reduced by extending HTNQ to process multiple packets instead of a single packet with each HTNQ callback.

Figure 8:
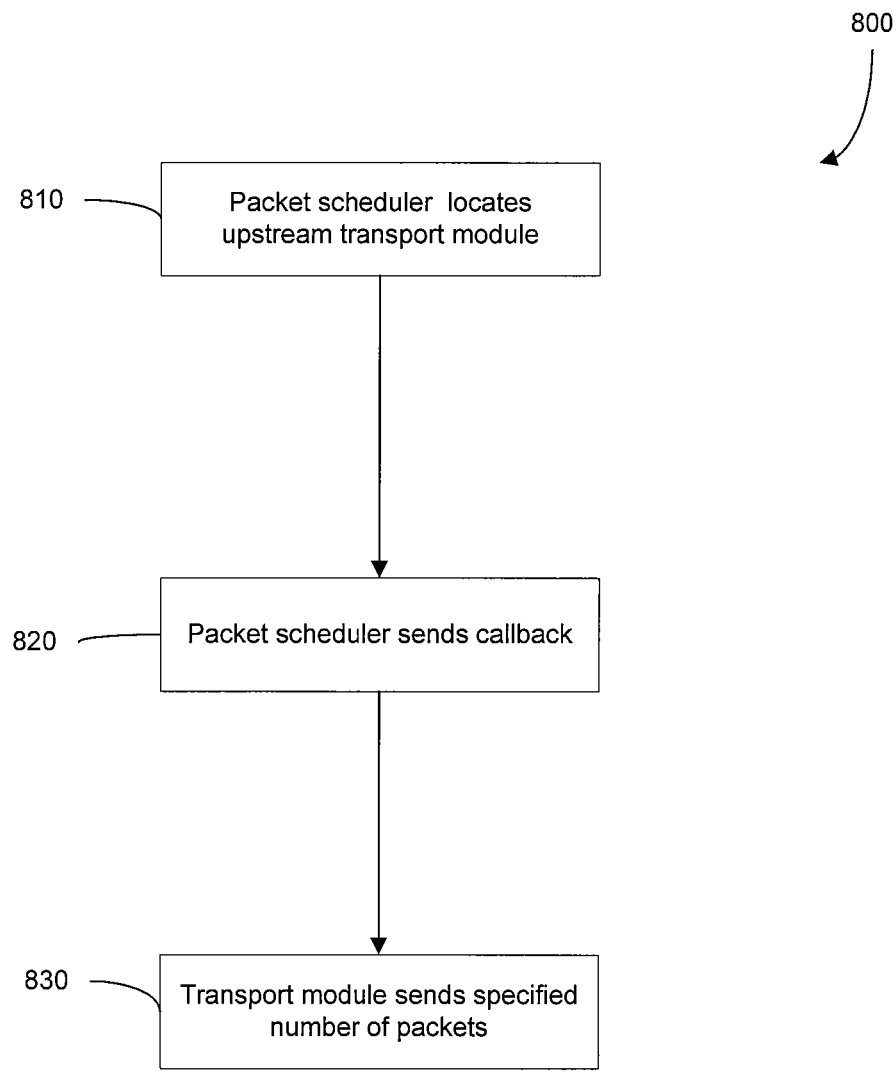
FIG. 8 illustrates a method for reducing overhead in a network-based HTNQ by processing multiple packets according to an embodiment of the present invention.

FIG. 8 illustrates a method 800 for reducing overhead in a network-based HTNQ by processing multiple packets according to an embodiment of the present invention. In step 810, packet scheduler locates an upstream transport module. In one embodiment, for network-based HTNQ to be realized, the HTNQ transport module and the HTNQ scheduling module find each other or "rendezvous" over the network. In general, it is not possible for the packet scheduler to determine where or how to communicate with the upstream transport module by merely inspecting a packet, e.g., in the case of a transparent proxy.

In one embodiment, additional signaling is provided for the packet scheduler to locate one or more upstream transport modules when these modules are not integrated in the same device as the packet scheduler. For example, the notification information can act as an indicator to identify a remote location of the transport module. One approach for performing such rendezvous would be in band, where the notification information required for the HTNQ callback is stored in each and every packet, e.g., as a TCP option or an IP option. Such information might include the IP address and a UDP or TCP port over which the scheduler is to contact the transport module. With this information, the scheduler could send HTNQ callbacks as notification messages sent over a connectionless protocol like UDP. Alternatively, the scheduler could establish a control connection using TCP between itself and the transport module and send all such HTNQ callbacks over said TCP connection. Many variations for such communication are possible and it would be obvious to one skilled in the art how to adapt the invention described herein to operate in different such contexts.

In step 820, a packet scheduler sends a callback to the transport module. In one embodiment, the HTNQ callback specifies the number of packets that the HTNQ-enabled transport is allowed to send on each callback. In another embodiment, the callback does not specify the number of packets to be sent. Alternatively, the limit on the number of packets provided in response to a HTNQ callback can be configured by a network administrator or built in to a particular implementation as a default value, which eliminates the need for the HTNQ callback to specify this limit.

In step 830, the HTNQ-enabled transport module sends from zero up to the specified number of packets in response to said callback. In one embodiment, processing multiple packets is done for non-network-based HTNQ. In one aspect, the size of the HTNQ queue should be increased to handle multiple packets for each active connection, in accordance with the limit on the number of packets. By allowing multiple packets to be communicated in response to a HTNQ callback, the cost of the callback latency is amortized across multiple packets.

In one embodiment, if a group of packets are sent, then there is one callback for the entire group. In another embodiment, if a group of packets are sent, there is one callback for each packet. The notification information may incorporate information regarding the group, such as the number of packets in the group.

IV. SOCKET BUFFER AUTOSIZING

In a further embodiment of the invention, the TCP module automatically adjusts the size of the buffer that is used to hold application data while the performing the TCP protocol functions. In order for TCP to perform well, such buffers need to be large enough to hold all of the data in transmitted on the network, i.e., large enough to "fill the pipe" between the sender and receiver, which is typically expressed as the bandwidth-delay product on the round-trip network path. However, if such buffers are too large, they waste unnecessary memory and they cause increased end-to-end delay between the sending application and the receiving application. The latter effect can be problematic for an interactive application or for a proxy that is attempting to optimize and prioritize among different application payloads. Traditionally, these buffers are called "socket buffers" deriving from the terminology used by the original Berkeley Source Distribution (BSD) networking implementation of the TCP/IP stack and the socket programming interface defined for networked applications.

As such, prior art has explored the idea of automatically determining optimal socket buffer sizes based on observations of the congestion window. This approach is called herein socket buffer autosizing. However, in a QoS-controlled TCP connection there is no meaningful congestion window. Hence the prior art for socket buffer autosizing is not applicable.

Thus, an embodiment of the present invention enables socket buffer autosizing in a different fashion. Here, the size of the socket buffer is adjusted to be optimal with respect to the HTNQ-enabled scheduler instead of the TCP congestion window. To this end, the size of the buffer is adjusted in accordance with an embodiment of the HTNQ callback mechanism as follows.

Figure 9A:
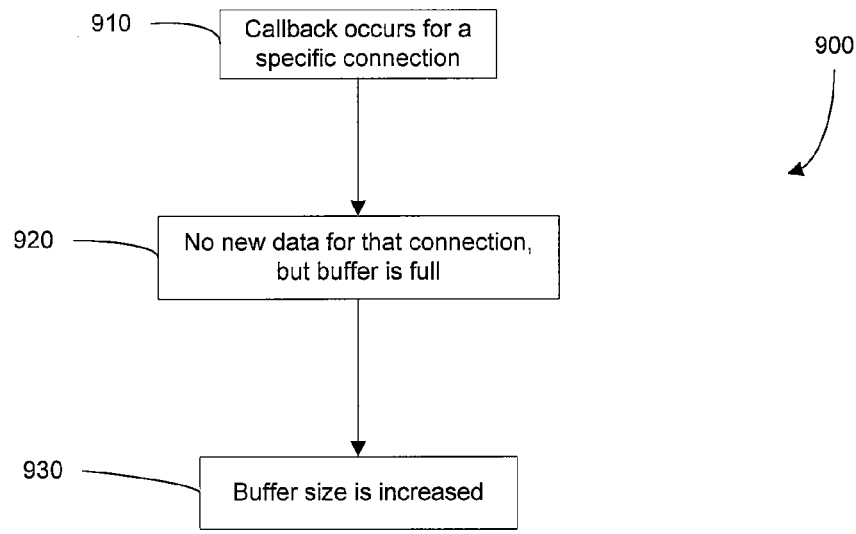
FIG. 9A is a flow diagram illustrating a method for increasing the size of a socket buffer according to an embodiment of the present invention.

FIG. 9A is a flow diagram illustrating a method 900 for increasing the size of a socket buffer according to an embodiment of the present invention. In step 910, a callback occurs for a specific connection. In step 920, it is determined that there is no new data to send for that connection, but the socket buffer is full. In step 930, the socket buffer size is increased by some amount because the network is otherwise underutilized. This allows the application to place more data in the buffer and to further increase the network utilization. This solves the problem of growing the buffer when it is too small.

Figure 9B:
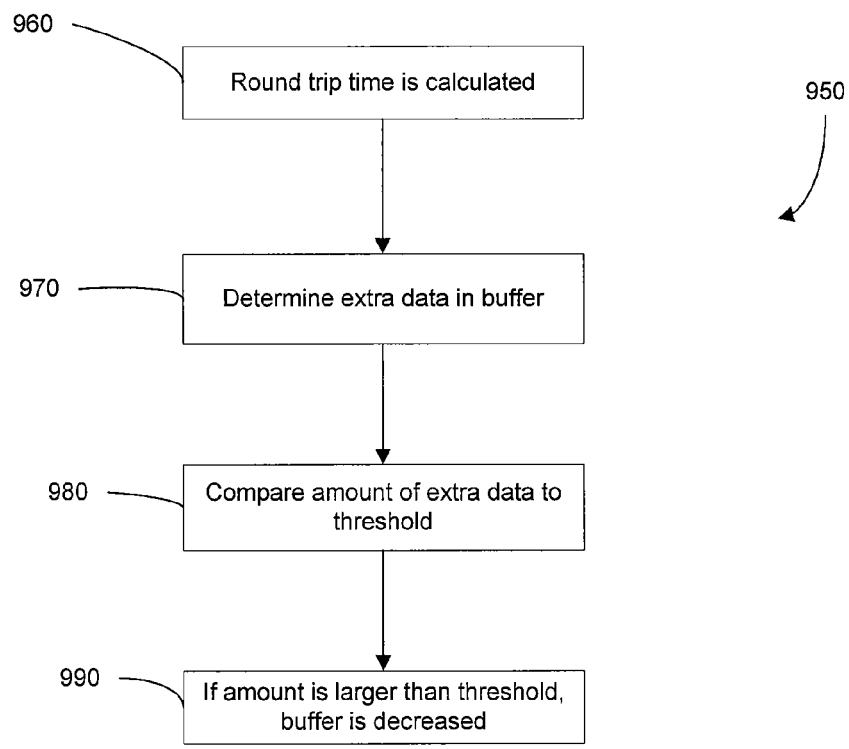
FIG. 9B is a flow diagram illustrating a method for decreasing the size of a socket buffer according to an embodiment of the present invention.

FIG. 9B is a flow diagram illustrating a method 950 for decreasing the size of a socket buffer according to an embodiment of the present invention. In one embodiment, to solve the problem of shrinking the buffer when it is too large, the TCP module performs a check for whether the buffer is too large on each or other predetermine number of HTNQ callbacks. In step 960, a round-trip time is calculated. In step 970, the amount of data that hasn't been sent but has been present in the buffer for more than a round-trip time is determined. In other words, this check determines whether there is extra data in the buffer that cannot be sent in the near future because the transmission is network or scheduler limited. In step 980, the amount of extra data is compared to a threshold. In step 990, if this amount is larger than some threshold, then the buffer is decreased.

The present invention can be implemented in the form of control logic in software or hardware or a combination of both. The control logic may be stored in an information storage medium as a plurality of instructions adapted to direct an information processing device to perform a set of steps disclosed in an embodiment of the present invention. Based on the disclosure and teachings provided herein, a person of ordinary skill in the art will appreciate other ways and/or methods to implement the present invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All publications, patents, and patent applications cited herein are hereby incorporated by reference in their entirety for all purposes.

REFERENCES

[Stoica97] I. Stoica, H. Zhang, and T. S. E. Ng. "A Hierarchical Fair Service Curve Algorithm for Link-Sharing, Real-Time and Priority Services". Proc ACM SIGCOMM '97.

[Floyd95] S. Floyd and V. Jacobson. Link-sharing and Resource Management Models for Packet Networks. IEEE/ACM Transactions on Networking, Vol. 3, No. 4, August 1995.

[Saltzer84] J. H. Saltzer, D. P. Reed, and D. D. Clark. End-to-end arguments in system design. ACM Transactions on Computer Systems vol 2, no. 4, November 1984.

[Balakrishnan95] Hari Balakrishnan, Srinivasan Seshan, and Randy H. Katz. Improving Reliable Transport and Handoff Performance in Cellular Wireless Networks. ACM Wireless Networks, vol 1, no. 4, December 1995.

What is claimed is:

1. A method of communicating packets over a network, the method comprising:

receiving, by a packet scheduler, at least two packets from a transport module, wherein the transport module is configured to implement a transport layer protocol, wherein the two packets are associated with two different transport layer connections, and wherein the two packets are queued in the same queue at the packet scheduler;

servicing, by the packet scheduler, a packet from the two packets; and providing, by the packet scheduler, a notification to the transport module in response to servicing the packet, wherein the notification includes information that identifies, from the two different transport layer connections, the transport layer connection that is associated with the packet.

2. The method of claim 1, further comprising:

receiving, by the transport module, data for at least one additional packet;

buffering, by the transport module, the data; and in response to receiving the notification from the packet scheduler, communicating one or more additional packets associated with the transport layer connection from the transport module to the packet scheduler.

3. The method of claim 2, wherein the notification includes information that specifies an amount of additional packets associated with the transport layer connection to communicate to the packet scheduler.

4. The method of claim 2, further comprising:

determining, by the transport module, whether to communicate the one or more additional packets to the packet scheduler based on a flow control window associated with the transport layer connection and not based on a congestion window associated with the transport layer connection.

5. The method of claim 2, further comprising:

determining, by the transport module, the transport layer connection based on the notification; and selecting the one or more additional packets associated with the transport layer connection to communicate to the packet scheduler.

6. The method of claim 1, wherein a packet in the one or more packets associated with the transport layer connection includes an indicator adapted to facilitate a notification to the transport module from the packet scheduler.

7. The method of claim 6, wherein the indicator identifies a procedure of the transport module.

8. The method of claim 7, wherein the procedure is adapted to be invoked by the packet scheduler using a local procedure invocation.

9. The method of claim 6, wherein the indicator identifies a remote location of the transport module.

10. The method of claim 1, wherein the transport module and the packet scheduler are operated within a same device.

11. The method of claim 10, wherein the device is a network proxy.

12. The method of claim 1, wherein the transport module and the packet scheduler are operated within different devices connected via a network.

13. The method of claim 1, further comprising:
    determining if a packet in the one or more packets includes an indicator associated with a transport module configured to receive notifications from the packet scheduler; and
    in response to determining that the packet does not include the indicator, bypassing the operation of providing the notification to the transport.

14. The method of claim 1, wherein the notification is provided to the transport module upon completion of the servicing of the one or more packets associated with the transport layer connection.

15. A network system that communicates packets, the network system comprising:
    a transport module configured to implement a transport layer protocol;
    a packet scheduler having an input for receiving at least two packets from the transport module, wherein the two packets are associated with two different transport layer connections, and wherein the two packets are queued in the same queue at the packet scheduler, the packet scheduler including;
      logic for servicing a packet from the two packets; and
      logic for providing a notification to the transport module in response to servicing the packet, wherein the notification includes information that identifies, from the two different transport layer connections, the transport layer connection that is associated with the packet.

16. The network system of claim 15, wherein the transport module includes:
    a first input for receiving the notification from the packet scheduler;
    a second input for receiving data for at least one additional packet;
    a buffer for buffering the data; and
    logic for communicating one or more additional packets associated with the transport layer connection to the packet scheduler in response to receiving the notification from the packet scheduler.

17. The network system of claim 16, further comprising:
    a proxy that is situated on a far end of a managed network path from the transport module, wherein a flow control window advertised by a receiving end of a transport connection in the managed network path is controlled via a configuration of said proxy or via automatic actions performed in said proxy.

18. The network system of claim 17, wherein the transport module further includes:
    logic for determining whether to communicate the one or more additional packets based on a flow control window associated with the transport layer connection and not based on a congestion window associated with the transport layer connection.

19. The network system of claim 16, wherein the transport module further includes:
    logic for identifying a connection of the transport module as HTNQ-enabled; and
    logic for including an indicator in a packet to be communicated to the packet scheduler through an HTNQ-enabled connection, wherein the indicator identifies a callback mechanism; and
    wherein the packet scheduler further includes:
      logic for determining whether a received packet includes an indicator specifying an association with an HTNQ-enabled connection; and
      logic for bypassing the operation of providing the notification when the received packet does not include the indicator.

20. The network system of claim 15, wherein the transport module and the packet scheduler are operated within the same device.

21. The network system of claim 20, wherein the device is a network proxy.

22. The network system of claim 15, wherein an amount of additional packets to communicate to the packet scheduler in response to the notification is configurable by a network administrator or hard coded as a default value.

23. The network system of claim 15, wherein the packet scheduler further comprises a queue adapted to have N buffer sections, wherein N equals a total number of active connections of the transport module.

24. A packet scheduler comprising:
    an input for receiving at least two packets from a transport module, wherein the transport module is configured to implement a transport layer protocol, wherein the two packets are associated with two different transport layer connections, and wherein the two packets are queued in the same queue at the packet scheduler;
    logic for servicing a packet from the two packets; and
    logic for providing a notification to the transport module in response to servicing the packet, wherein the notification includes information that identifies, from the two different transport layer connections, the transport layer connection that is associated with the packet.

25. The packet scheduler of claim 24, further comprising:
    logic for identifying an indicator in the packet, wherein the logic for providing the notification uses the indicator to facilitate the providing of the notification to the transport module.

26. The packet scheduler of claim 24, wherein the queue is adapted to have N buffer sections, wherein N equals the number of active connections of the transport module.

27. The packet scheduler of claim 24, further comprising:
    logic for dropping a non-HTNQ packet from the queue when a number of non HTNQ packets exceed a non-HTNQ queue limit.

28. The packet scheduler of claim 27, further comprising:
    logic for dropping an HTNQ packet from the queue when a number of HTNQ packets exceed an HTNQ queue limit; and
    logic for providing an exception condition indicating a number of supportable connections has been exceeded when an HTNQ packet is dropped from the queue.

29. The packet scheduler of claim 24, further comprising:
    logic for determining whether the received packet includes an indicator specifying an association with an HTNQ-enabled transport module; and logic for bypassing the operation of providing the notification when the packet does not include the indicator.

30. The packet scheduler of claim 24, wherein an amount of additional packets to communicate to the packet scheduler in response to the notification is included in the notification.

31. A transport module comprising:
a first input for receiving a notification from a packet scheduler, wherein the notification identifies a transport layer connection from two different transport layer connections, wherein at least one packet associated with each of the two transport layer connections is queued in the same queue at the packet scheduler, wherein the notification indicates that one or more packets associated with the identified transport layer connection were serviced by the packet scheduler, wherein the transport module is configured to implement a transport layer protocol;
a second input for receiving data for at least one additional packet;
a buffer for buffering the data; and
logic for communicating one or more additional packets associated with the identified transport layer connection to the packet scheduler in response to receiving the notification from the packet scheduler.

32. The transport module of claim 31, further comprising:
logic for determining whether to communicate the one or more additional packets based on a flow control window associated with the transport layer connection and not based on a congestion window associated with the transport layer connection.

33. The transport module of claim 31, further comprising:
logic for identifying the transport layer connection based on the notification; and
logic for selecting the one or more additional packets associated with the transport layer connection to communicate to the packet scheduler.

34. The transport module of claim 31, further comprising:
logic for identifying a connection of the transport module as HTNQ-enabled; and
logic for including an indicator in the one or more additional packets when the one or more additional packets are sent to an HTNQ-enabled connection, wherein the indicator identifies a callback mechanism.

35. The transport module of claim 31, further comprising a plurality of connections.

36. The transport module of claim 35, further comprising a bit for each connection, the bit stating whether the connection is active.

37. The transport module of claim 36, further comprising logic that sets a bit to indicate that a connection is active when data is received for that connection.

38. The transport module of claim 36, further comprising logic that sets a bit to indicate that a connection is idle when a notification is received from the packet scheduler and when no packets need to be transmitted for that connection.

39. The transport module of claim 35, further comprising:
a plurality of classes that are grouped in a hierarchical link-sharing organization, and wherein at least one group of the classes are HTNQ enabled and QoS controlled and another group of the classes are congestion-controlled.

40. A method of communicating packets over a network, the method comprising:
receiving, by a packet scheduler, at least one packet from a transport module, wherein the transport module is configured to implement a transport layer protocol;
servicing, by the packet scheduler, the received packet;
providing, by the packet scheduler, a notification to the transport module in response to servicing the received packet;
receiving, by the transport module, data for at least one additional packet;
buffering, by the transport module, the data;
determining, by the transport module, a network connection associated with the received packet based on the notification;
selecting one or more additional packets corresponding to the associated network connection to communicate to the packet scheduler;
in response to receiving the notification from the packet scheduler, communicating, the one or more additional packets from the transport module to the packet scheduler;
calculating a round-trip time for the associated network connection;
determining an amount of additional packets that have been in a buffer of the transport module for longer than the round trip time; and
decreasing a size of the buffer when the amount is larger than a threshold.

41. A method of communicating packets over a network, the method comprising:
receiving, by a packet scheduler, at least one packet from a transport module, wherein the transport module is configured to implement a transport layer protocol;
servicing, by the packet scheduler, the received packet;
providing, by the packet scheduler, a notification to the transport module in response to servicing the received packet;
receiving, by the transport module, data for at least one additional packet;
buffering, by the transport module, the data;
determining, by the transport module, a network connection associated with the received packet based on the notification;
selecting one or more additional packets corresponding to the associated network connection to communicate to the packet scheduler;
in response to receiving the notification from the packet scheduler, communicating, the one or more additional packets from the transport module to the packet scheduler;
determining whether additional packets for a particular network connection are available;
determining whether a buffer of the transport module is full when there are no additional packets available for that particular network connection; and
increasing a size of the buffer when the buffer is full and there are no additional packets available for that particular network connection.

42. A transport module comprising:
a first input for receiving a notification from a packet scheduler, wherein the notification is responsive to at least one packet sent from the transport module, wherein the transport module is configured to implement a transport layer protocol;
a second input for receiving data for at least one additional packet;
a buffer for buffering the data;
logic for determining a network connection associated with the received packet based on the notification;
logic for selecting the one or more additional packets corresponding to the associated network connection to communicate to the packet scheduler;

logic for communicating one or more additional packets to the packet scheduler in response to receiving the notification from the packet scheduler;

logic for calculating a round-trip time for the associated network connection;

logic for determining an amount of additional packets that have been in a buffer of the transport module for longer than the round trip time; and logic for decreasing a size of the buffer when the amount is larger than a threshold.

43. A transport module comprising:

a first input for receiving a notification from a packet scheduler, wherein the notification is responsive to at least one packet sent from the transport module, wherein the transport module is configured to implement a transport layer protocol;

a second input for receiving data for at least one additional packet;

a buffer for buffering the data;

logic for determining a network connection associated with the received packet based on the notification;

logic for selecting the one or more additional packets corresponding to the associated network connection to communicate to the packet scheduler;

logic for communicating one or more additional packets to the packet scheduler in response to receiving the notification from the packet scheduler;

logic for determining whether additional packets for a particular network connection are available;

logic for determining whether a buffer of the transport module is full when there are no additional packets available for that network connection; and logic for increasing a size of the buffer when the buffer is full and there are no additional packets available for that network connection.

* * * * *